US012560082B1

(12) United States Patent
Liu et al.

(10) Patent No.: US 12,560,082 B1
(45) Date of Patent: Feb. 24, 2026

(54) METHOD FOR MIRROR IMAGING OF GAS HOLDUP IN GAS-WATER TWO-PHASE FLOW BASED ON FIBER OPTIC PROBE ARRAY

(71) Applicant: Yangtze University, Jingzhou (CN)

(72) Inventors: Junfeng Liu, Jingzhou (CN); Jinting Zhang, Jingzhou (CN)

(73) Assignee: Yangtze University, Jingzhou (CN)

( * ) Notice: Subject to any disclaimer, the term of this patent is extended or adjusted under 35 U.S.C. 154(b) by 0 days.

(21) Appl. No.: 19/074,694

(22) Filed: Mar. 10, 2025

(30) Foreign Application Priority Data

Dec. 24, 2024 (CN) .......................... 202411907877.9

(51) Int. Cl.
*E21B 47/11* (2012.01)
*E21B 47/113* (2012.01)
*G01D 5/353* (2006.01)

(52) U.S. Cl.
CPC ........ *E21B 47/114* (2020.05); *G01D 5/35374* (2013.01)

(58) Field of Classification Search
CPC .... E21B 47/114; E21B 47/12; G01D 5/35374
See application file for complete search history.

(56) References Cited

U.S. PATENT DOCUMENTS

2012/0166108 A1* 6/2012 Whittaker ............... E21B 47/10
702/45
2017/0051607 A1* 2/2017 Whittaker ............... E21B 43/24

OTHER PUBLICATIONS

Yangtze University (Applicant), Replacement claims (allowed) of CN202411907877.9, Aug. 6, 2025.
CNIPA, Notification to grant patent right for invention in CN202411907877.9, Aug. 15, 2025.

* cited by examiner

*Primary Examiner* — Kevin K Pyo
(74) *Attorney, Agent, or Firm* — Hemisphere Law, PLLC

(57) ABSTRACT

A method for mirror imaging of gas holdup in gas-water two-phase flow based on a fiber optic probe array includes: projecting six fiber optic probes of a FIT onto a cross-section of a wellbore at a same height, gridding and normalizing an inner diameter of the wellbore and probe positions to obtain a cross-sectional grid, and determining a two-dimensional coordinate of each fiber optic probe within the cross-sectional grid and a local gas holdup at each fiber optic probe; rotating, based on a radial symmetry of gas-water flow along the wellbore center, the six fiber optic probes counterclockwise to obtain mirror probes which are radially symmetrical and coordinates thereof; and predicting gas holdup at each mirror probe to obtain predicted gas holdup values, interpolating the predicted gas holdup values in the cross-sectional grid by an interpolation algorithm to obtain a reconstructed gas-water image of the cross-section of the wellbore.

5 Claims, 16 Drawing Sheets

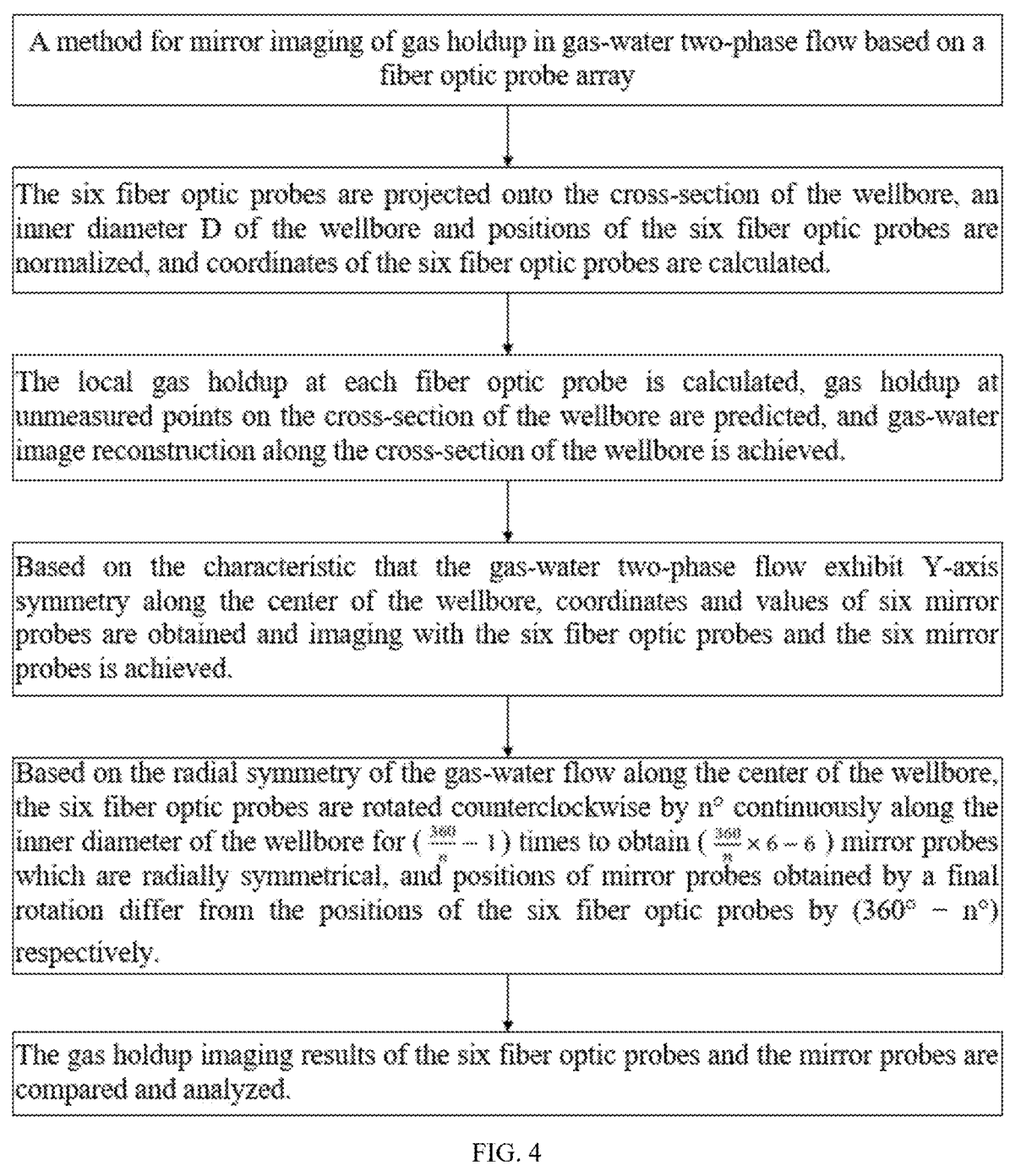

A method for mirror imaging of gas holdup in gas-water two-phase flow based on a fiber optic probe array

↓

The six fiber optic probes are projected onto the cross-section of the wellbore, an inner diameter D of the wellbore and positions of the six fiber optic probes are normalized, and coordinates of the six fiber optic probes are calculated.

↓

The local gas holdup at each fiber optic probe is calculated, gas holdup at unmeasured points on the cross-section of the wellbore are predicted, and gas-water image reconstruction along the cross-section of the wellbore is achieved.

↓

Based on the characteristic that the gas-water two-phase flow exhibit Y-axis symmetry along the center of the wellbore, coordinates and values of six mirror probes are obtained and imaging with the six fiber optic probes and the six mirror probes is achieved.

↓

Based on the radial symmetry of the gas-water flow along the center of the wellbore, the six fiber optic probes are rotated counterclockwise by $n°$ continuously along the inner diameter of the wellbore for $(\frac{360}{n} - 1)$ times to obtain $(\frac{360}{n} \times 6 - 6)$ mirror probes which are radially symmetrical, and positions of mirror probes obtained by a final rotation differ from the positions of the six fiber optic probes by $(360° - n°)$ respectively.

↓

The gas holdup imaging results of the six fiber optic probes and the mirror probes are compared and analyzed.

FIG. 4

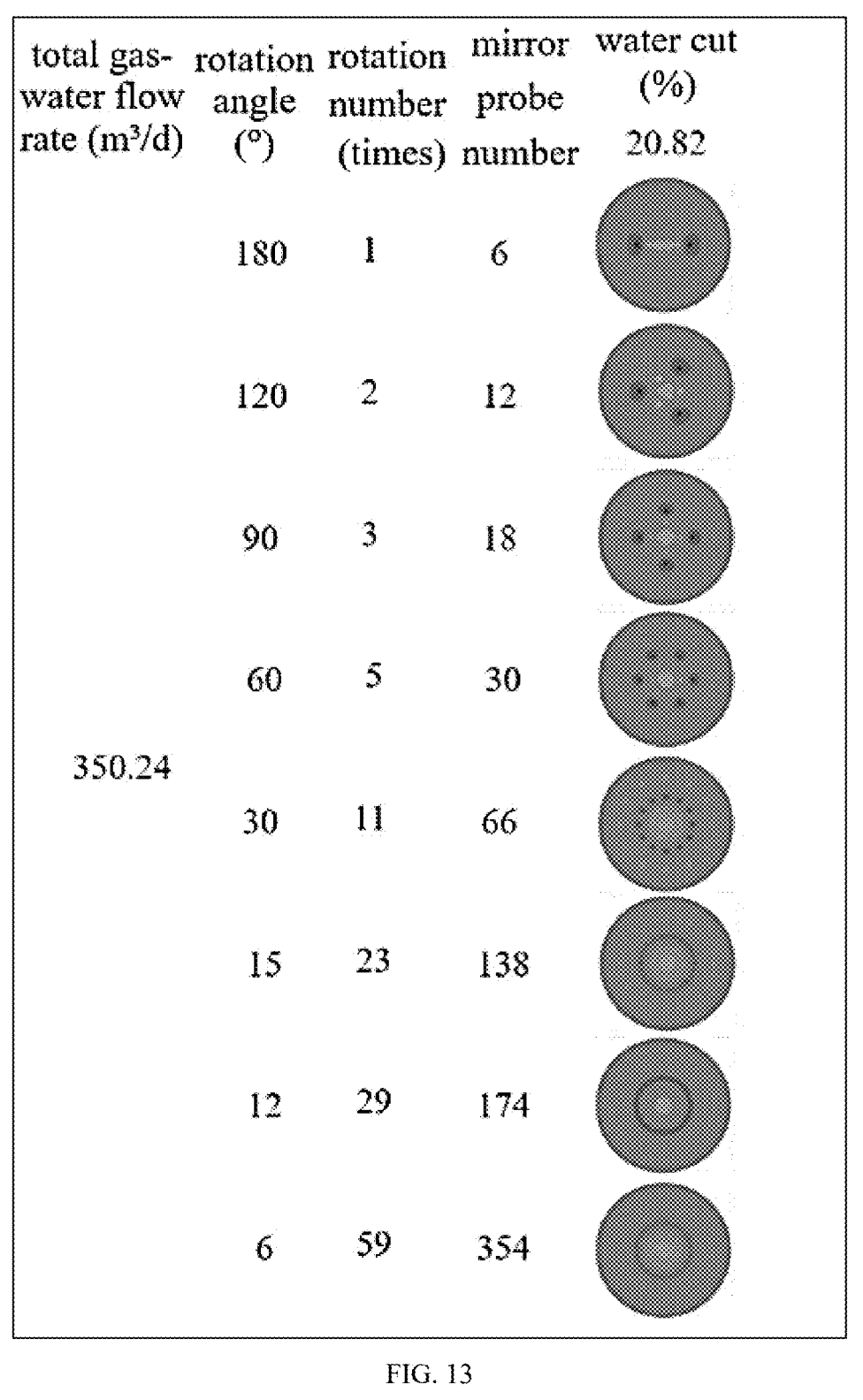

| total gas-water flow rate (m³/d) | rotation angle (°) | rotation number (times) | mirror probe number | water cut (%) 20.82 |
|---|---|---|---|---|
| | 180 | 1 | 6 | |
| | 120 | 2 | 12 | |
| | 90 | 3 | 18 | |
| | 60 | 5 | 30 | |
| 350.24 | 30 | 11 | 66 | |
| | 15 | 23 | 138 | |
| | 12 | 29 | 174 | |
| | 6 | 59 | 354 | |

FIG. 13

METHOD FOR MIRROR IMAGING OF GAS HOLDUP IN GAS-WATER TWO-PHASE FLOW BASED ON FIBER OPTIC PROBE ARRAY

TECHNICAL FIELD

The disclosure relates to the field of dynamic well monitoring technologies, and more particularly to a method for mirror imaging of gas holdup in gas-water two-phase flow based on a fiber optic probe array.

BACKGROUND

Natural gas is one of the clean energy sources. In China, the development intensity of the natural gas in various gas fields is increasing year by year. Conducting dynamic monitoring of gas well production status has significant application value. By analyzing data of production profile logging, locations of gas and water production, fluid properties of each producing layer, and production information of each phase can be determined. Traditional vertical gas-water two-phase production profile logging in gas wells usually employs a seven-parameter combination (natural gamma, magnetic positioning, temperature, pressure, flow rate, density, and capacitance water holdup or gas holdup) for single-point sampling measurements at the center of the production wellbore cross-section. This method has limitations such as a restricted measurement location and an inability to reflect the fluid information at different positions across the entire wellbore cross-section.

SUMMARY

A purpose of the disclosure is to provide a method for mirror imaging of gas holdup in gas-water two-phase flow based on a fiber optic probe array, to overcome limitations of single-point measurements in the related art.

In order to achieve above purpose, the disclosure provides the following technical solutions.

The method for mirror imaging of the gas holdup in the gas-water two-phase flow based on the fiber optic probe array, includes:

projecting six fiber optic probes of a Flow Imaging Tool (FIT) onto a cross-section of a wellbore at a same height, gridding and normalizing an inner diameter of the wellbore and positions of the six fiber optic probes to obtain a cross-sectional grid, and determining a two-dimensional coordinate of each fiber optic probe within the cross-sectional grid and a local gas holdup at the two-dimensional coordinate of each fiber optic probe;

rotating, based on a radial symmetry of gas-water flow along a center of the wellbore, the six fiber optic probes counterclockwise by n° around the inner diameter of the wellbore for $$\left(\frac{360}{n} - 1\right)$$

times to obtain mirror probes, and obtaining coordinates of the mirror probes, where positions of mirror probes obtained by a final rotation differ from the positions of the six fiber optic probes by (360°−n°) respectively, the mirror probes are radially symmetrical and a number of the mirror probes is $$\left(\frac{360}{n} \times 6 - 6\right);$$

and predicting, based on the two-dimensional coordinate of each fiber optic probe and the local gas holdup at the two-dimensional coordinate of each fiber optic probe, a gas holdup at the coordinates of each mirror probe to obtain predicted gas holdup values of the mirror probes, interpolating the predicted gas holdup values of the mirror probes in the cross-sectional grid by using an interpolation algorithm to obtain a reconstructed gas-water image of the cross-section of the wellbore.

In an embodiment, the projecting six fiber optic probes of a FIT onto a cross-section of a wellbore at a same height, gridding and normalizing an inner diameter of the wellbore and positions of the six fiber optic probes to obtain a cross-sectional grid includes:

projecting each fiber optic probe of the FIT onto the cross-section of the wellbore to obtain multiple projection positions which are non-uniformly distributed, using a line formed by connecting the six projection positions as an X-axis, a perpendicular line to the X-axis as a Y-axis, and the center of the wellbore as a coordinate origin, and gridding and normalizing the cross-section of the wellbore to obtain the cross-sectional grid, where the cross-sectional grid includes coordinate data for each grid cell.

In an embodiment, calculation formulas of the two-dimensional coordinate of each fiber optic probe within the cross-sectional grid are as follows:

$$l_i' = l_i \times \cos\vartheta$$

$$x_i = \left| \frac{d}{2} - \frac{l_i'}{D} \right|$$

where $l_i'$ represents a distance from a projection point of an i-th fiber optic probe of the six fiber optic probes to a bottom of the FIT, $l_i$ represents a length of a part of an arm of the FIT from the i-th fiber optic probe to the bottom of the FIT, $\vartheta$ represents an opening angle of the FIT, D represents the inner diameter of the wellbore, d represents a normalized inner diameter of the wellbore, and $x_i$ represents the two-dimensional coordinate of the i-th fiber optic probe.

In an embodiment, a calculation formula of the local gas holdup at the two-dimensional coordinate of each fiber optic probe is as follows:

$$Y_{gi} = \frac{M_i - M_w}{M_g - M_w}$$

where $Y_{gi}$ represents a value of the local gas holdup at the i-th fiber optic probe, $M_i$ represents a measurement response value of the i-th fiber optic probe, $M_g$ represents a response value of the i-th fiber optic probe in pure gas, and $M_w$ represents a response value of the i-th fiber optic probe in pure water.

In an embodiment, the obtaining coordinates of the mirror probes includes:

rotating each fiber optic probe $A_i$ (i=1, 2 to 6) with the two-dimensional coordinate of $(x_i, y_i)$ (i=1, 2 to 6) in the cross-sectional grid counterclockwise by θ° around a coordinate origin, multiplying a rotation matrix R(θ) with a coordinate vector $$\begin{bmatrix} x_i \\ y_i \end{bmatrix},$$

and determining a rotated coordinate point (x$_{ij}$', y$_{ij}$') as follows:

$$\begin{bmatrix} x'_{ij} \\ y'_{ij} \end{bmatrix} = R(\theta_j) \begin{bmatrix} x_i \\ y_i \end{bmatrix}$$

$$\begin{cases} x'_{ij} = x_i \cos(\theta_j) - y_i \sin(\theta_j) & (i = 1, 2, \dots, 6, \\ y'_{ij} = x_i \sin(\theta_j) + y_i \cos(\theta_j) & j \in Z, Z \text{ represents an integer set}) \end{cases}$$

where $\theta_j$ represents a j-th rotation angle, and x$_{ij}$' and y$_{ij}$' represent the coordinates of a corresponding mirror probe obtained by rotating the i-th fiber optic probe at the j-th rotation angle.

In an embodiment, a calculation formula of the rotation matrix R(θ) is as follows:

$$R(\theta) = \begin{bmatrix} \cos(\theta) & -\sin(\theta) \\ \sin(\theta) & \cos(\theta) \end{bmatrix}$$

where θ represents a rotation angle with a unit being radians.

In an embodiment, a calculation formula of the rotation angle is as follows:

$$\theta = \left(0, \frac{360}{n} - 1\right) \times \frac{n\pi}{180}$$

where n represents an angle of each rotation $$\frac{360}{n}$$

∈ Z, Z represents an integer set, and π is a mathematical constant pi.

In an embodiment, the determining a local gas holdup at the two-dimensional coordinate of each fiber optic probe includes:

calculating, based on calibration values in single-phase water and single-phase gas, combined with a volume model, the local gas holdup at the two-dimensional coordinate of each fiber optic probe according to response values of each fiber optic probe.

According to embodiments provided by the disclosure, the disclosure discloses the following technical effects.

The disclosure discloses the method for mirror imaging of the gas holdup in the gas-water two-phase flow based on the fiber optic probe array, and the method includes: projecting six fiber optic probes of a FIT onto a cross-section of a wellbore at a same height, gridding and normalizing an inner diameter of the wellbore and positions of the six fiber optic probes to obtain a cross-sectional grid, and determining a two-dimensional coordinate of each fiber optic probe within the cross-sectional grid and a local gas holdup at the two-dimensional coordinate of each fiber optic probe; rotating, based on a radial symmetry of gas-water flow along a center of the wellbore, the six fiber optic probes counterclockwise around along the cross-section of the wellbore to obtain multiple mirror probes which are radially symmetrical and coordinates thereof; and predicting a gas holdup at the coordinates of each mirror probe to obtain predicted gas holdup values of the mirror probes, interpolating the predicted gas holdup values of the mirror probes in the cross-sectional grid by using an interpolation algorithm to obtain a reconstructed gas-water image of the cross-section of the wellbore. The method can overcome limitations of single-point measurements.

BRIEF DESCRIPTION OF DRAWINGS

In order to more clearly illustrate technical solutions of embodiments of the disclosure or in the related art, a brief introduction is given to the drawings required for the embodiments. It is apparent that the drawings described below are only some embodiments of the disclosure. For those skilled in the art, other drawings can be obtained based on these drawings without creative labor.

FIG. 3A illustrates a schematic diagram of a conventional single-probe central single-position measurement with seven parameters, and FIG. 3B illustrates a schematic diagram of six fiber optic probes measuring information at six different positions in an FIT according to the embodiment of the disclosure.

FIG. 4 illustrates a flowchart of a method for mirror imaging of gas holdup according to the embodiment of the disclosure.

FIG. 8A illustrates a schematic diagram of a gridding process of twelve probes obtained by mirroring the six fiber optic probes once according to the embodiment of the disclosure, and FIG. 8B illustrates a schematic diagram of image reconstruction with the twelve probes.

FIG. 10A illustrates a schematic effect diagram of mirror imaging when a total gas-water flow rate is 400 cubic meters per day (m³/d), and FIG. 10B illustrates a schematic effect diagram of mirror imaging when a total gas-water flow rate is 550 m³/d.

FIG. 11A illustrates a schematic statistical diagram of gas holdup when the total gas-water flow rate is 400 m³/d, and FIG. 11B illustrates a schematic statistical diagram of gas holdup when the total gas-water flow rate is 550 m³/d.

FIG. 13 illustrates a comparative diagram of gas holdup at different mirroring times for an entire flow layer according to the embodiment.

DETAILED DESCRIPTION OF EMBODIMENTS

Figure 1:
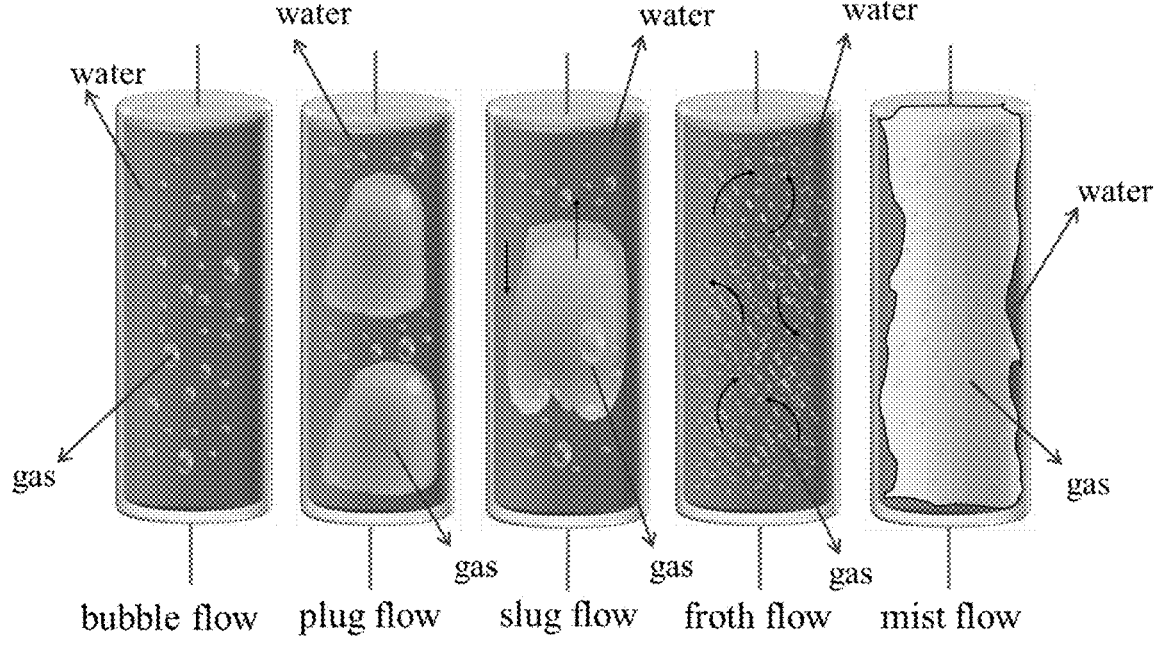
FIG. 1 illustrates a schematic diagram of a theoretical flow pattern of gas-water two-phase flow in a vertical well according to an embodiment of the disclosure.

The technical solutions in the embodiments of the disclosure are clearly and completely described below in conjunction with the accompanying drawings. Apparently, the illustrated embodiments are only a part of the embodiments of the disclosure, not all of them. Based on the embodiments of the disclosure, all other embodiments obtained by those skilled in the art without creative labor are within the scope of protection of the disclosure.

A purpose of the disclosure is to provide a method for mirror imaging of gas holdup in gas-water two-phase flow based on a fiber optic probe array, which can overcome limitations of single-point measurements in the related art.

In order to make the above purpose, features, and advantages of the disclosure more apparent and understandable, further detailed explanations of the disclosure are provided below in conjunction with the accompanying drawings and specific embodiments.

In order to overcome the limitations of single-point measurements, based on the response information of the fiber optic probe array from multi-point measurements and integrating the flow characteristics of the gas-water two-phase flow under different flow conditions in a vertical well, the disclosure proposes the method for mirror imaging of the gas holdup in the gas-water two-phase flow based on the fiber optic probe array. The method includes following steps. (1) In a flow simulation loop wellbore, an FIT is used to conduct simulation experiments under different total gas-water flow rates and different water cuts in the vertical well. It is found that the experimental flow pattern mainly includes four types: bubble flow, plug flow, slug flow and froth flow, and the gas-water two-phase flow exhibits symmetrical distribution along a central axis of the vertical wellbore. (2) Based on data collected by six fiber optic probes of the FIT, an interpolation algorithm is used to predict information at unmeasured points and reconstruct an image of the gas and water phases along the cross-section of the wellbore. (3) Combining symmetrical distribution characteristics of fluid flow, a mirror imaging technology is proposed for the first time; The six fiber optic probes are rotated counterclockwise by n° continuously along a radial direction of the wellbore for $$\left(\frac{360}{n} - 1\right)$$

times to obtain mirror probes, positions of mirror probes obtained by a final rotation differ from initial positions of the six fiber optic probes by (360°−n°) respectively, thereby achieving gas holdup cross-sectional imaging with $$\left(\frac{360}{n} \times 6\right)$$

probes including the mirror probes and the six fiber optic probes.

The method for mirror imaging of the gas holdup enables comprehensive measurement of the cross-section of the wellbore with a smaller number of probes, allowing for more accurate calculation of the gas holdup of the gas-water two-phase flow in the cross-section of the wellbore, and better reflecting fluid properties of each producing layer within the wellbore, thereby enhancing the effectiveness of production profiling and providing technical support for water shutoff and gas enhancement operations.

Based on the above technical solutions, taking FIG. 1 to FIG. 11B as an example, specific processes of the above steps are explained in detail.

Geometric states of gas and water flowing upward along a pipe can be categorized into several basic types, i.e., flow patterns. As shown in FIG. 1, from left to right, there are five typical flow patterns in vertical well gas-water two-phase flow. It can be observed that: with the increase of gas volume (gas content), the flow patterns change sequentially from bubble flow, to plug flow, slug flow, froth flow, and spray flow. Under combined effects of gravity, buoyancy, and pressure difference, each flow pattern in the vertical wellbore is essentially radially symmetrically distributed along the central axis of the wellbore.

Figure 2:
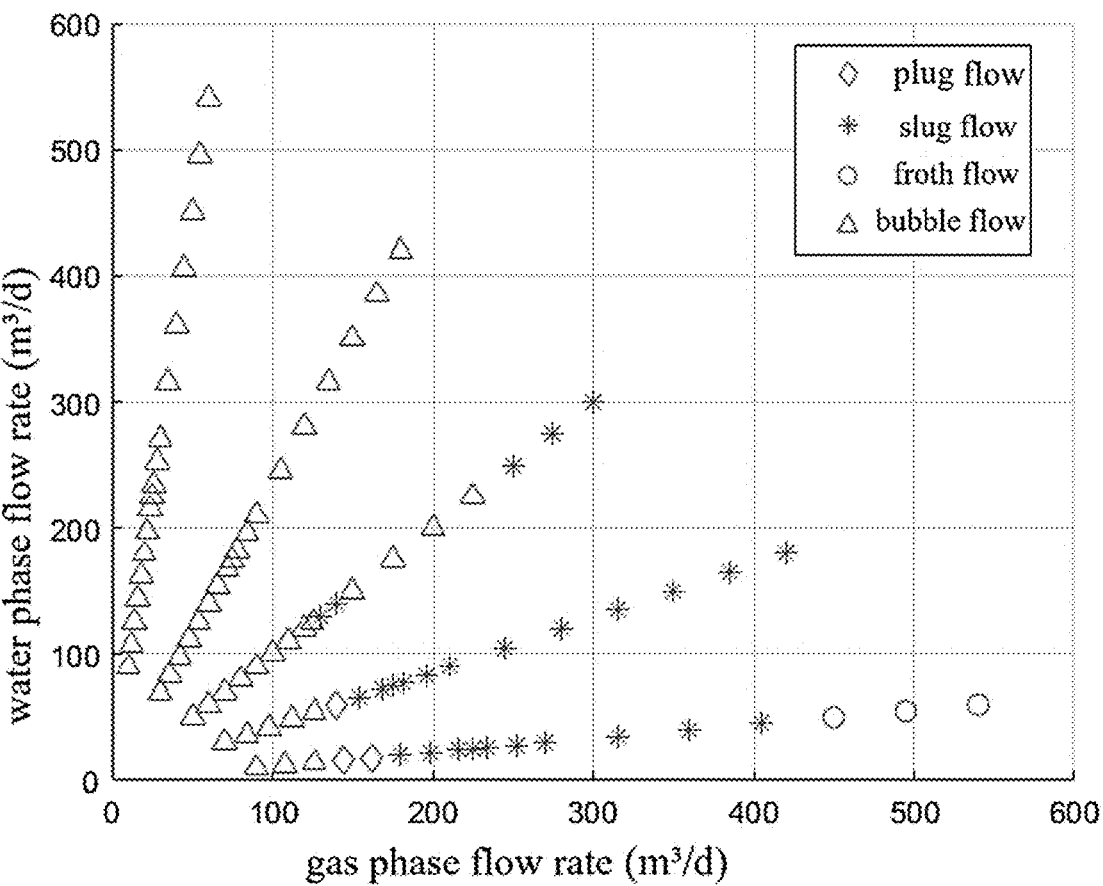
FIG. 2 illustrates a schematic diagram of an experimental flow pattern of the gas-water two-phase flow in the vertical well according to the embodiment of the disclosure.

Referring to the current production status of low-yield gas wells on mainland China, based on a flow loop simulation experimental device and the FIT, the disclosure designs an experimental plan as shown in Table 1, and carries out simulated measurements under different flow rates and different water cuts. As shown in FIG. 2, a total of four flow patterns are identified in this experiment: the bubble flow, the plug flow, the slug flow, and the froth flow.

TABLE 1

| experimental schemes | |
| --- | --- |
| Total flow rate (m³/d) | Water cut (%) |
| 100, 120, 140, 160, 180, 200, 220, 240, 250, 260, 280, 300, 350, 400, 450, 500, 550, 600 | 10, 30, 50, 70, 90 |

The gas holdup, also referred to as void fraction, cross-sectional gas holdup, or real gas holdup, refers to a ratio of a gas phase area to an entire cross-sectional area of the wellbore in two-phase flow. The formation of the flow patterns is mainly determined by factors such as the well inclination, the flow rate of each phase, the pipe diameter, the fluid density, and the viscosity. There is a direct correlation between the gas holdup and the flow patterns. Under different flow patterns, the distribution and variation patterns of gas holdup differ.

Figure 3A:
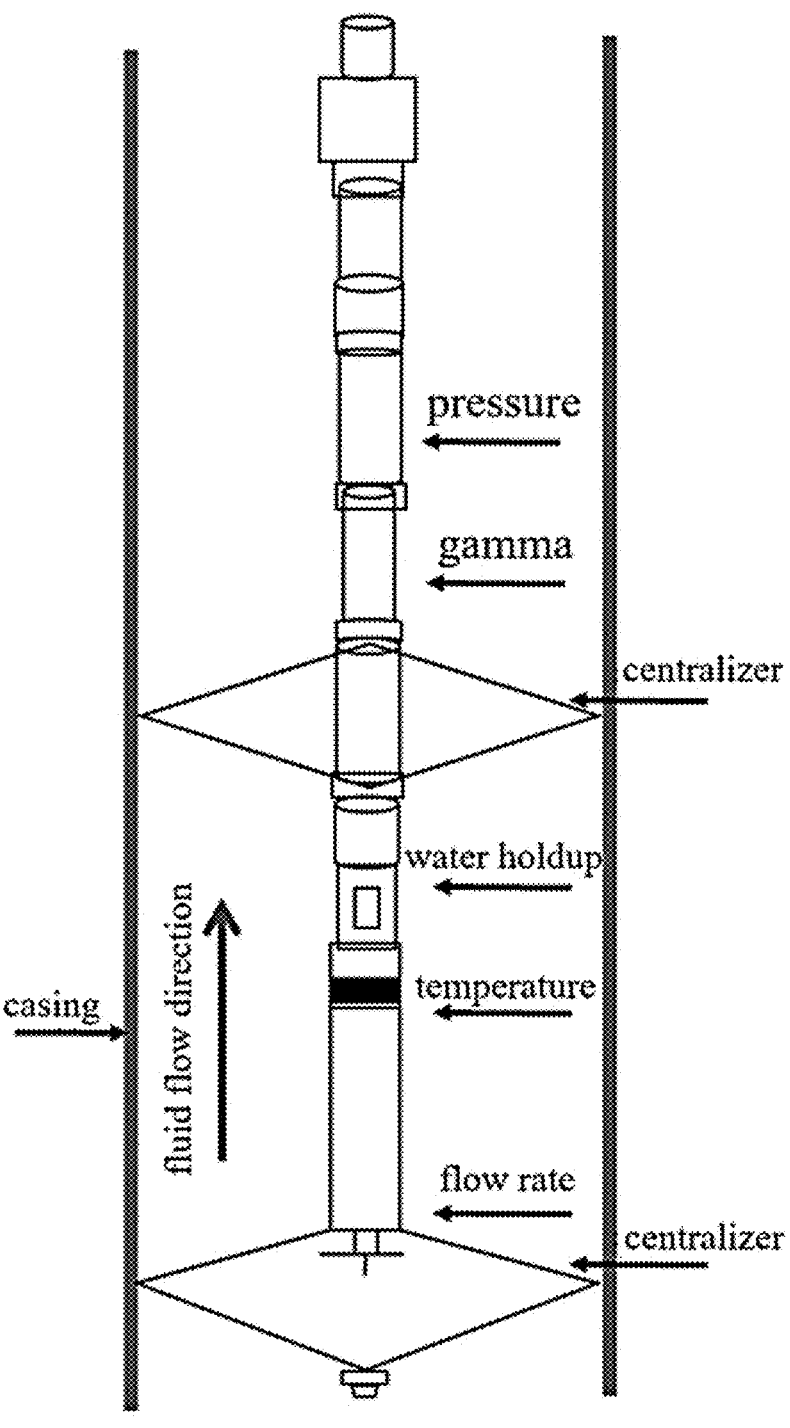
FIG. 3A and FIG. 3B illustrate instrument comparison diagrams according to the embodiment of the disclosure; where
Figure 3B:
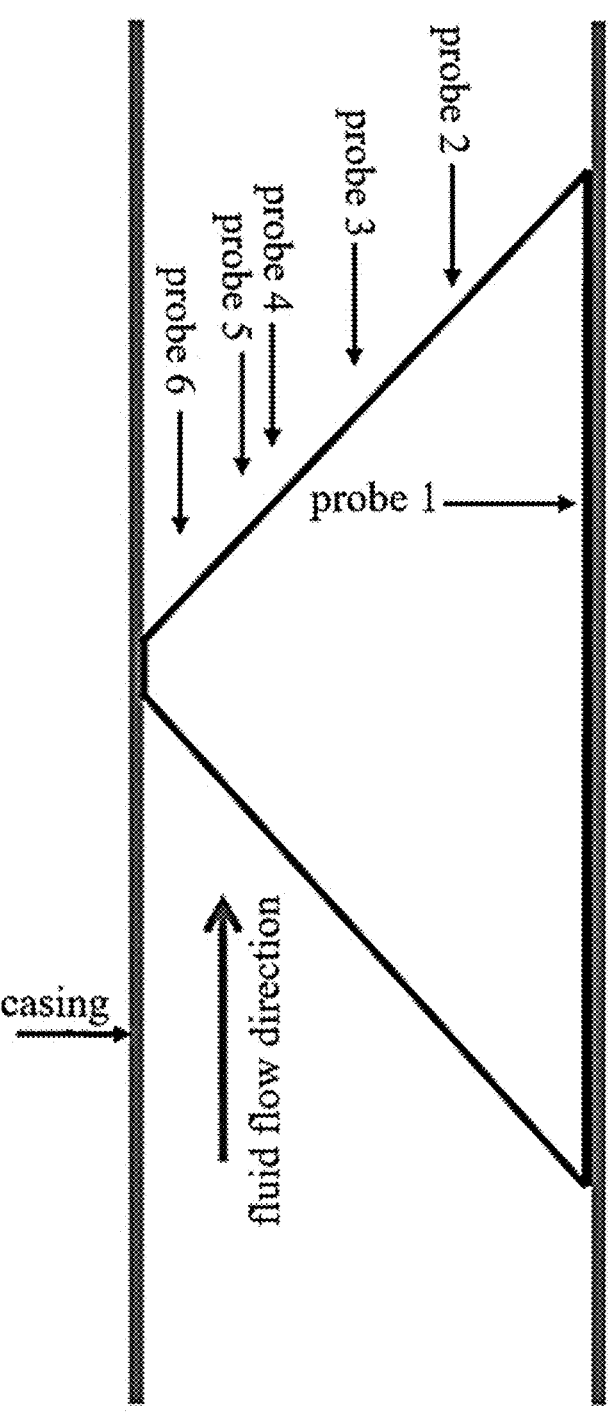

As shown in FIG. 3A, in production profiling logging of gas wells in various gas fields in China, a centralized, single-position sampling measurement (referred to as production logging tool, PLT) is commonly used within the wellbore. FIG. 3B illustrates the FIT used in the disclosure, which includes the six fiber optic probes capable of measuring local gas holdups at six different positions. Apparently, compared to the PLT, the FIT provides more fluid distribution information across the cross-section of the wellbore, but the number of measurement points is still insufficient. Meanwhile, increasing the number of measurement probes in the cross-section of the wellbore (to 12 or 16) would also disturb the normal flow of the fluid. To address this, based on the characteristic that vertical gas-water two-phase flow exhibits radial symmetry along the center of the wellbore, the disclosure proposes the method for mirror imaging based on the six fiber optic probes.

A process of the disclosure is shown in FIG. 4. (1) The six fiber optic probes of the FIT are projected onto the cross-section of the wellbore at a same height, an inner diameter D of the wellbore and positions of the six fiber optic probes are normalized, and coordinates of the six fiber optic probes on a two-dimensional coordinate system and the cross-section of the wellbore are calculated. (2) Based on calibration values in single-phase water and single-phase gas, combined with a volume model, a local gas holdup at each fiber optic probe is calculated according to response values of each fiber optic probe, gas holdup at unmeasured points on the cross-section of the wellbore are predicted by combining the interpolation algorithm, and gas-water image reconstruction along the cross-section of the wellbore is thereby achieved under different flow rates and different water cuts. (3) Based on the characteristic that the gas-water two-phase flow in the vertical wellbore exhibits symmetry along the center of the wellbore during stable flow, the concept of mirror probe imaging is proposed, that is: the six fiber optic probes are virtually imaged symmetrically along the center of the wellbore, which is equivalent to having measurement values of twelve fiber optic probes. In this way, the local gas holdups at twelve different positions along an X-axis on the cross-section of the wellbore can be directly and indirectly obtained. (4) Then, the six fiber optic probes are rotated counterclockwise by n° continuously along the inner diameter of the wellbore for $$\left(\frac{360}{n} - 1\right)$$

times to obtain $$\left(\frac{360}{n} \times 6 - 6\right)$$

mirror coordinate points which are radially symmetrical to the positions of the six fiber optic probes, positions of mirror probes obtained by a final rotation differ from the positions of the six fiber optic probes by (360°−n°) respectively, and an entire wellbore image is thereby reconstructed by using the mirror probes and interpolation. (5) The image reconstruction results of the six fiber optic probes and the mirror probes are compared and analyzed. Specific steps are as follows.

Step 1, the six fiber optic probes of the FIT are projected onto the cross-section of the wellbore at the same height, the inner diameter D of the wellbore and the positions of the six fiber optic probes are normalized, and the two-dimensional coordinates of the six fiber optic probes on the cross-section of the wellbore are calculated.

Step 2, the local gas holdup at each fiber optic probe is calculated and used to predict the gas holdup at the unmeasured points, and a gas-water image of the cross-section of the wellbore is reconstructed.

Step 3, Based on the symmetrical pattern of the gas-water flow along the center of the wellbore, the concept of mirroring probes is proposed: the six fiber optic probes are expanded symmetrically along the center of the wellbore to obtain the local gas holdups at twelve positions, and then the wellbore cross-sectional image reconstruction is achieved based on the local gas holdups at the twelve positions through interpolation.

Step 4, Based on the radial symmetry of the gas-water flow along the center of the wellbore, the six fiber optic probes are rotated counterclockwise by n° along the inner diameter of the wellbore for $$\left(\frac{360}{n} - 1\right)$$

times to obtain $$\left(\frac{360}{n} \times 6 - 6\right)$$

mirror probes, positions of mirror probes obtained by a final rotation differ from the positions of the six fiber optic probes by (360°−n°) respectively, and the mirror probes are radially symmetrical to the positions of the six fiber optic probes, and used to reconstruct a wellbore image.

Step 5, the gas holdup imaging results of the six fiber optic probes and the mirror probes are compared and analyzed.

As a specific implementation, the step 1 specifically includes the following steps.

Figure 5:
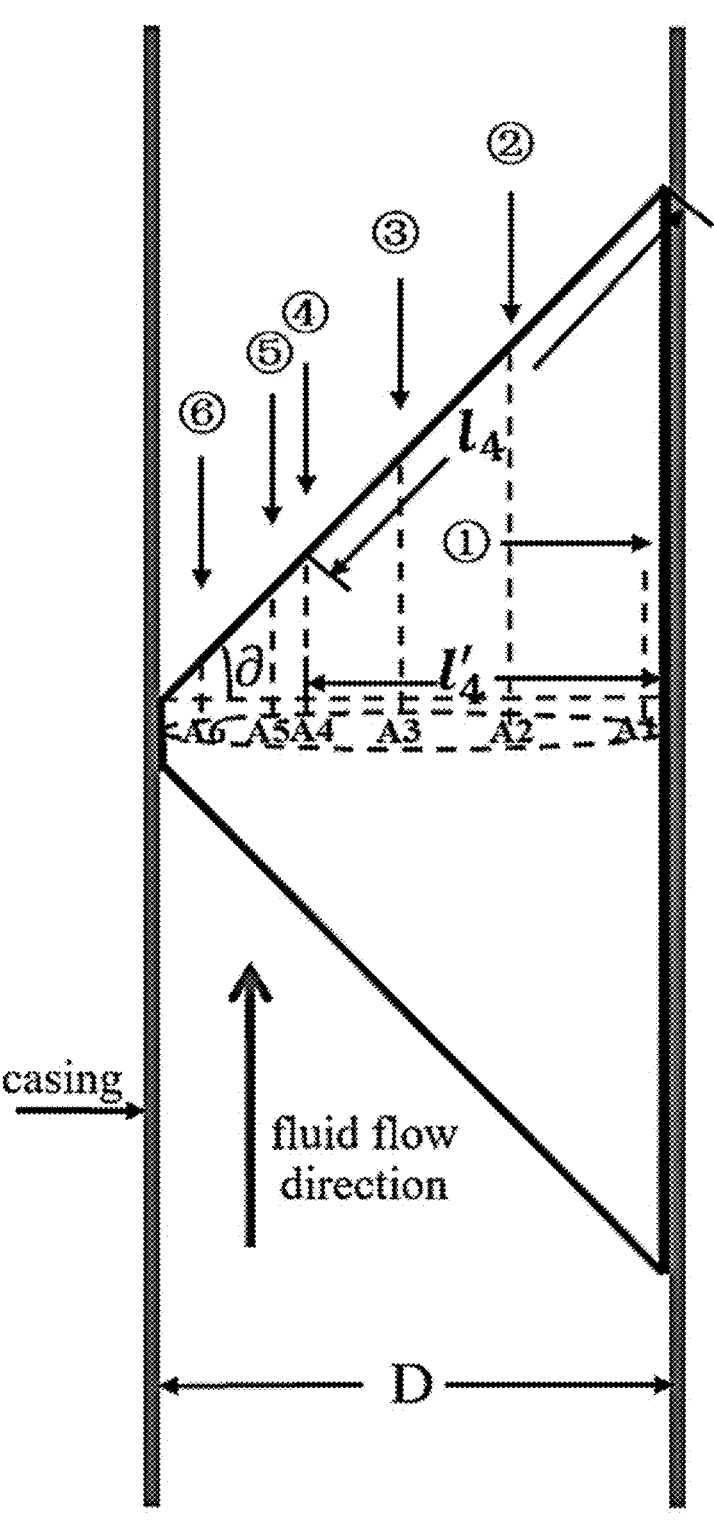
FIG. 5 illustrates a schematic diagram of probe projections according to the embodiment of the disclosure.
Figure 6:
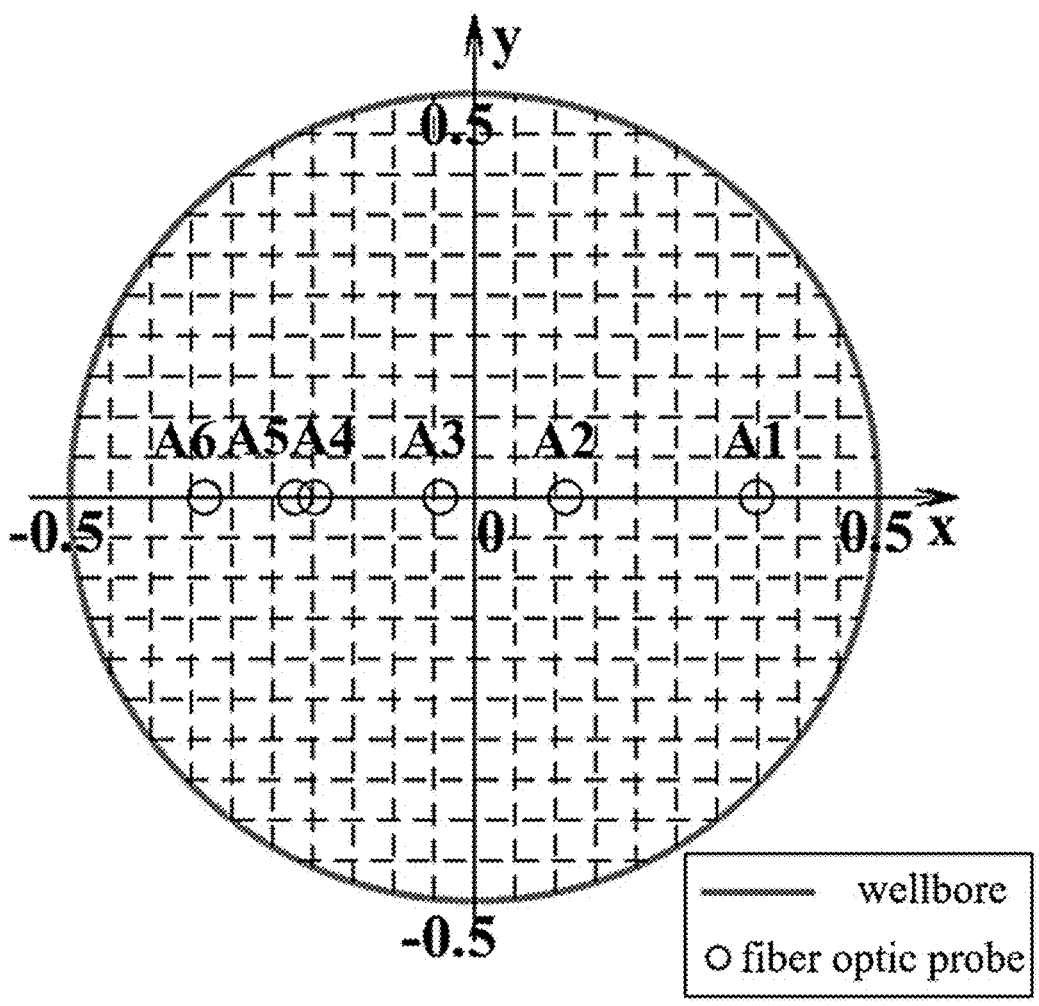
FIG. 6 illustrates a schematic diagram of a gridding process of the fiber optic probes according to the embodiment of the disclosure.

As shown in FIG. 5, the position of each fiber optic probe on an arm of the FIT is fixed. When the FIT is disposed in wellbores of different inner diameters D, opening angles $\partial$ of two FIT arms are different, and a projection position of each fiber optic probe on the cross-section of the wellbore changes accordingly. Each fiber optic probe is vertically projected onto the same wellbore cross-section, and the projection positions of the six fiber optic probes on the cross-section of the wellbore are sequentially denoted as A1, A2 to A6, and are non-uniformly distributed. As shown in FIG. 6, a line formed by connecting the projection positions as an X-axis is as an X-axis, a perpendicular line to the X-axis is as a Y-axis, the center of the wellbore is as a coordinate origin, the cross-section of the wellbore is gridded and normalized to obtain a normalized coordinate (i.e., two-dimensional coordinate) of each fiber optic probe (with a normalized inner diameter of the wellbore denoted as d), and calculation formulas of coordinate values are as follows:

$$l_i' = l_i \times \cos\partial$$

$$x_i = \left| \frac{d}{2} - \frac{l_i'}{D} \right|$$

where $l_i'$ represents a distance from a projection point of an i-th fiber optic probe of the six fiber optic probes to a bottom of the FIT, with a unit being millimeter (mm), $l_i$ represents a length of a part of the arm of the FIT from the i-th fiber optic probe to the bottom of the FIT, with a unit being mm, $\partial$ represents an opening angle of the FIT, with a unit being °, D represents the inner diameter of the wellbore, with a unit being mm, d represents the normalized inner diameter of the wellbore, and $x_i$ represents the normalized abscissa of the i-th fiber optic probe.

As a specific implementation, the step 2 specifically includes the following steps.

To obtain an entire gas holdup image on the cross-section of the wellbore, it is necessary to preprocess response values of the fiber optic probes at six different positions on the same cross-section of the wellbore to obtain a value of the local gas holdup near each fiber optic probe. Subsequently, the interpolation algorithm is used to predict the gas holdup at the unmeasured points. The local gas holdup is calculated as follows:

$$Y_{gi} = \frac{M_i - M_w}{M_g - M_w}$$

where $Y_{gi}$ represents the value of the local gas holdup at the i-th fiber optic probe, $M_i$ represents a measurement response value of the i-th fiber optic probe, $M_g$ represents a response value of the i-th fiber optic probe in pure gas, and $M_w$ represents a response value of the i-th fiber optic probe in pure water.

Figure 7:
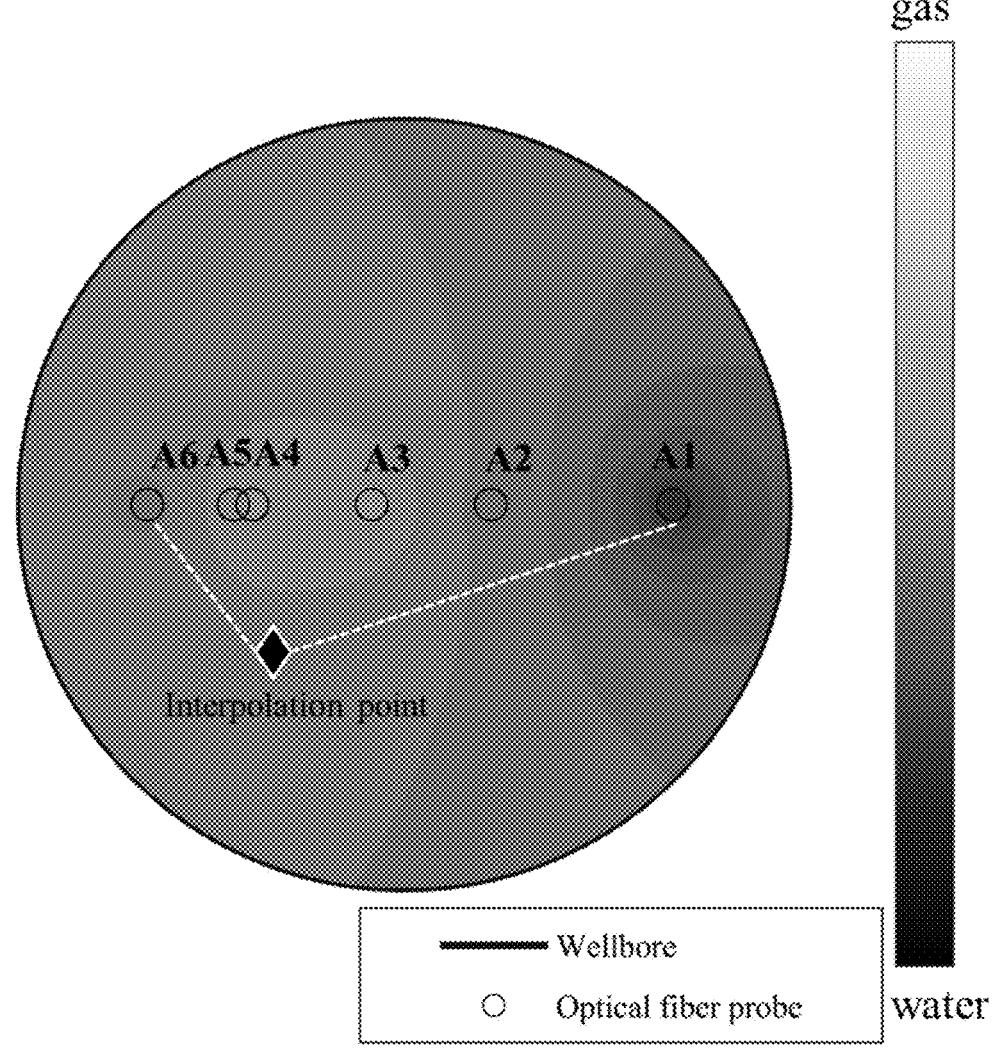
FIG. 7 illustrates a schematic diagram of cross-sectional image reconstruction of a wellbore with the six fiber optic probes according to the embodiment of the disclosure.

FIG. 7 illustrates a schematic diagram of gas-water image reconstruction on the cross-section of the wellbore after interpolation. The color scale transitions from black to white, representing a transition from the water phase to the gas phase. It is assumed that there is an interpolation point to be predicted within the wellbore; the closer the fiber optic probe is to the interpolation point, the greater its contribution to the interpolation result, and the farther the fiber optic probe is from the interpolation point, the smaller its contribution to the interpolation result. It can be seen that the interpolation point is closer to a sixth fiber optic probe (A6) and farther from a first fiber optic probe 1 (A1), and thus the contribution of the sixth fiber optic probe to the interpolation point is greater. Therefore, the predicted value of the interpolation point is closer to the measurement value of the sixth fiber optic probe, that is, it may show a gas phase at the interpolation point. Apparently, in the gas holdup imaging obtained using only the six fiber optic probes, the left side mainly shows the gas phase, and the right side mainly shows the water phase, which does not correspond with an actual flow phenomenon.

As a specific implementation, the step 3 specifically includes the following steps.

As shown in FIG. 7, on the X-axis, the six fiber optic probes are non-uniformly distributed around the coordinate origin. Based on the symmetrical pattern of the gas-water flow during flowing along the wellbore, the six fiber optic probes are mirrored along the Y-axis (i.e., the six fiber optic probes are rotated counterclockwise by) 180° to obtain coordinates of six mirror probes A1', A2' to A6' (as shown in Table 2) and predicted local gas holdup values of the mirror probes as follows:

$$x_i' = -x_i$$

$$Y_{gi}' = Y_{gi}$$

where $x_i'$ represents an abscissa of an i-th mirror probe, $x_i$ represents an abscissa of the i-th fiber optic probe, $Y_{gi}$ represents the value of the local gas holdup at the i-th fiber optic probe, and $Y_{gi}'$ represents a value of the local gas holdup at the i-th mirror probe.

TABLE 2

| Coordinates of six fiber optic probes and six mirror probes after normalization (mirror symmetric along the Y-axis) | | |
| --- | --- | --- |
| Number of fiber optic probe | Coordinate of fiber optic probe $(x_i, y_i)$ | Coordinate of mirror probe $(x_i', y_i')$ |
| A1 | (0.349194, 0) | (−0.349194, 0) |
| A2 | (0.112661, 0) | (−0.112661, 0) |
| A3 | (−0.04234, 0) | (0.04234, 0) |
| A4 | (−0.19726, 0) | (0.19726, 0) |
| A5 | (−0.22185, 0) | (0.22185, 0) |
| A6 | (−0.33387, 0) | (0.33387, 0) |

Figure 8A:
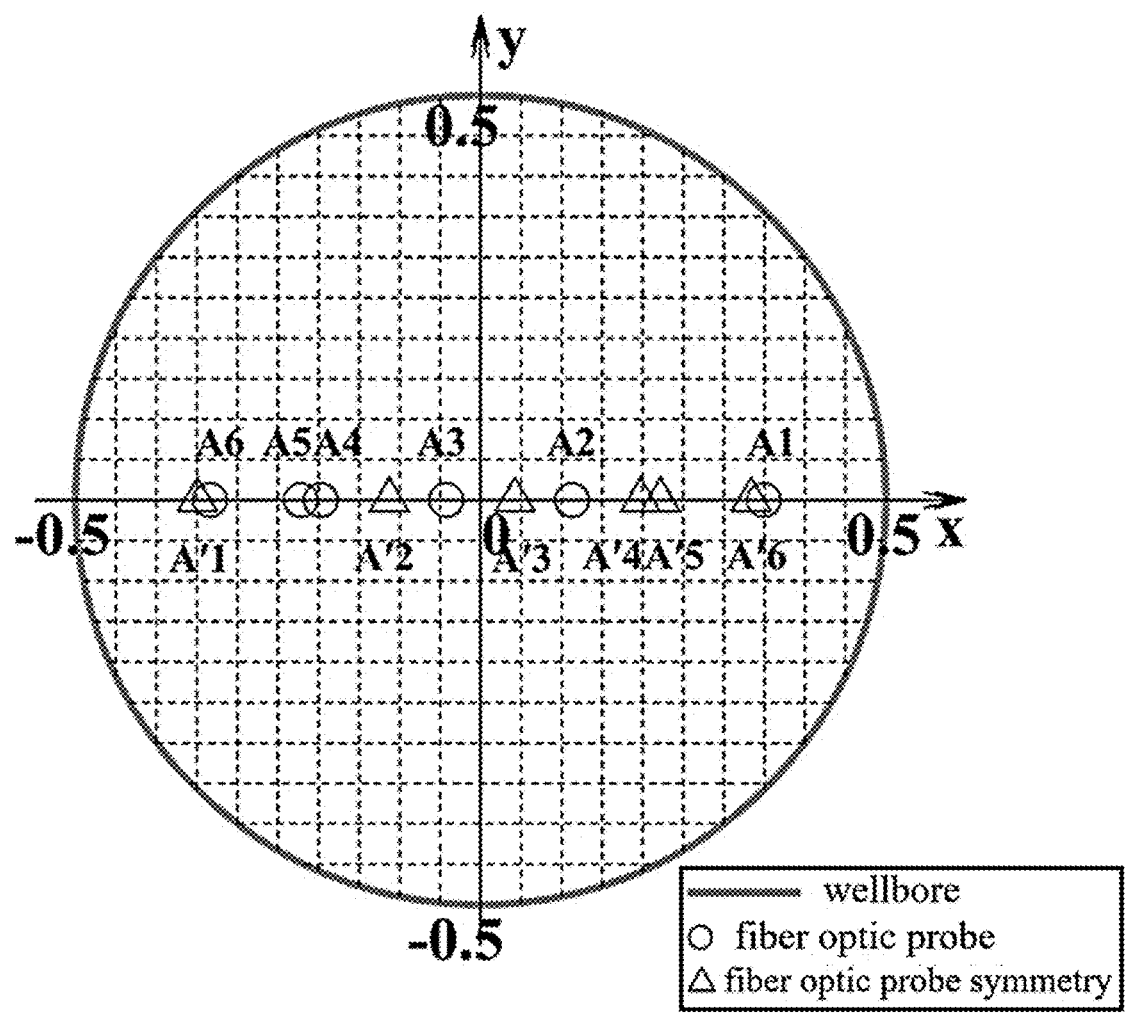
FIG. 8A and FIG. 8B illustrate schematic diagrams of mirroring the six fiber optic probes once according to the embodiment; where
Figure 8B:
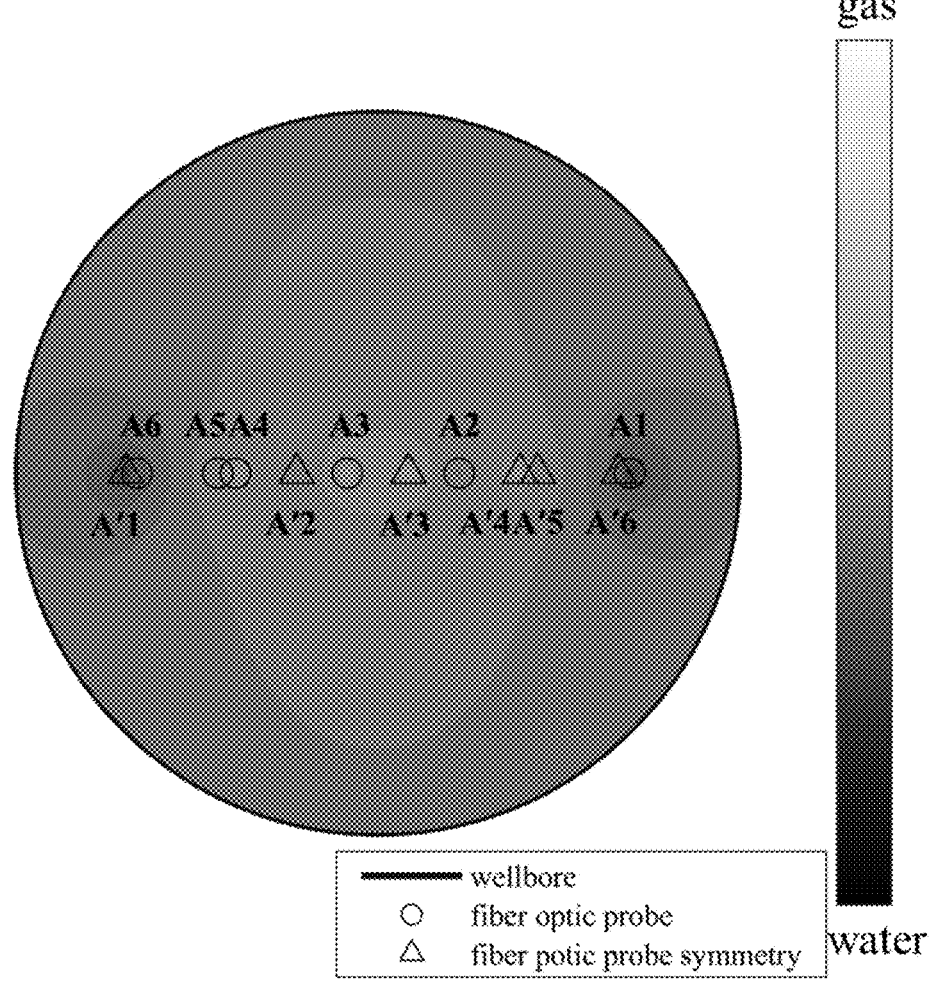

The effect of using the six fiber optic probes and the six mirror probes for gas-water image reconstruction is shown in FIG. 8A and FIG. 8B. FIG. 8A illustrates the spatial distribution of the twelve probes after mirror symmetry. FIG. 8B illustrates a schematic diagram of image reconstruction with the twelve probes. Apparently, the imaging after the mirror symmetry along the Y-axis is more in line with the symmetry pattern of vertical well gas-water flow, but the upper and lower sides are in the gas phase, which is not consistent with reality.

As a specific implementation, the step 4 specifically includes the following steps.

As shown in FIG. 8B, although the imaging effect has improved after one mirror, it still does not conform to the radial symmetry of gas-water flow along the center of the wellbore. Therefore, the six fiber optic probes are rotated counterclockwise by n° continuously along a radial direction of the wellbore for $$\left(\frac{360}{n} - 1\right)$$

times, with positions of mirror probes obtained by a final rotation differing from the positions of the six fiber optic probes by (360°−n°) respectively, to obtain a coordinate point and a predicted value of the local gas holdup at each mirror probe. Specific steps are as follows.

A rotation matrix $R(\theta)$ is as follows:

$$R(\theta) = \begin{bmatrix} \cos(\theta) & -\sin(\theta) \\ \sin(\theta) & \cos(\theta) \end{bmatrix}$$

where $\theta$ represents a rotation angle with a unit being radians.

$$\theta = \left(0, \frac{360}{n} - 1\right) \times \frac{n\pi}{180}$$

where n represents an angle of each rotation, $$\frac{360}{n} \in Z,$$

Z represents an integer set, with a unit being °, and $\pi$ is a mathematical constant pi, approximately equal to 3.14159.

Each of the six fiber optic probes $A_i$ (i=1, 2 to 6) with the two-dimensional coordinate of $(x_i, y_i)$ (i=1, 2 to 6) is rotated counterclockwise by $\theta°$ around the coordinate origin, the rotation matrix $R(\theta)$ is multiplied with a coordinate vector $$\begin{bmatrix} x_i \\ y_i \end{bmatrix}$$

to obtain a rotated coordinate point $(x_{ij}', y_{ij}')$ as follows:

$$\begin{bmatrix} x_{ij}' \\ y_{ij}' \end{bmatrix} = R(\theta_j) \begin{bmatrix} x_i \\ y_i \end{bmatrix}$$

$$\begin{cases} x_{ij}' = x_i\cos(\theta_j) - y_i\sin(\theta_j) \\ y_{ij}' = x_i\sin(\theta_j) + y_i\cos(\theta_j) \end{cases}$$

$$(i = 1, 2, \ldots, 6, j \in Z, Z \text{ represents an integer set})$$

where $\theta_j$ represents a j-th rotation angle, and $x_{ij}'$ and $y_{ij}'$ represent the coordinates of the mirror probe obtained by rotating the i-th fiber optic probe at the j-th rotation angle.

Figure 9:
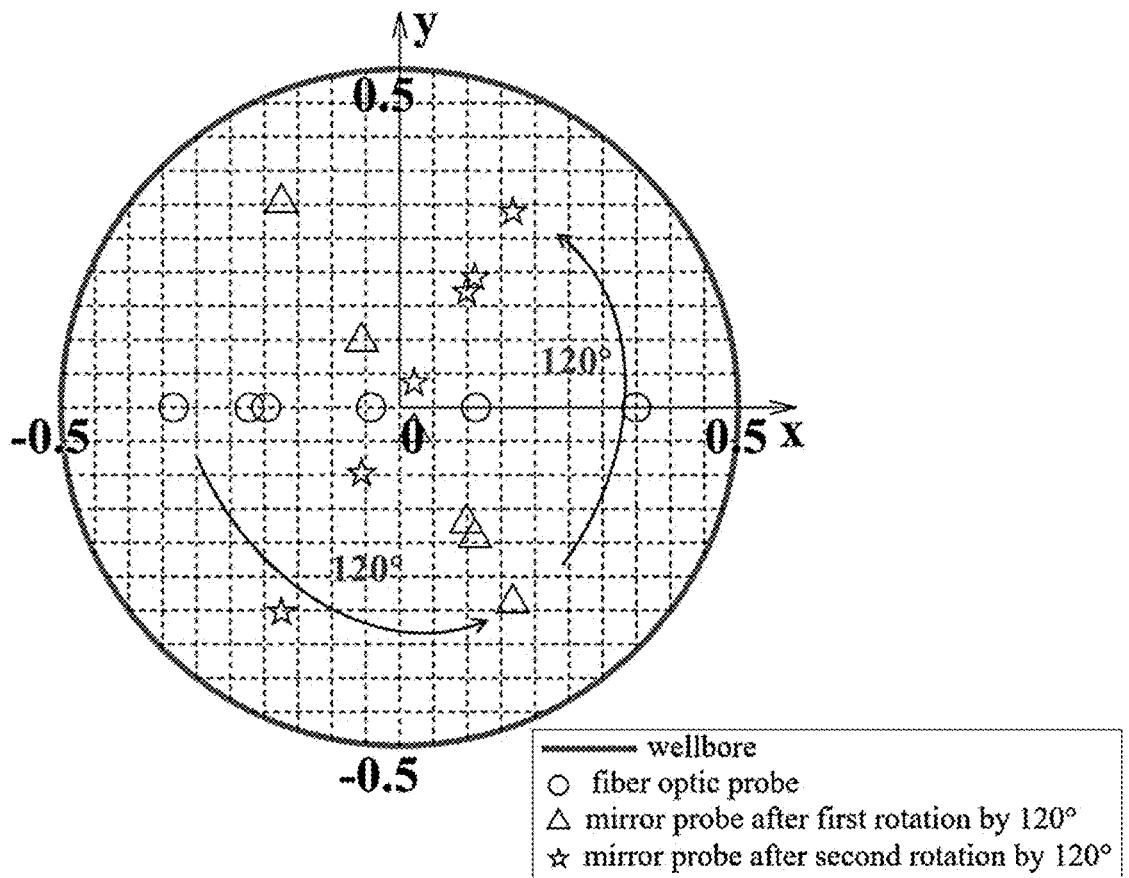
FIG. 9 illustrates a schematic diagram of rotating the six fiber optic probes counterclockwise twice according to the embodiment of the disclosure.
Figure 10A:
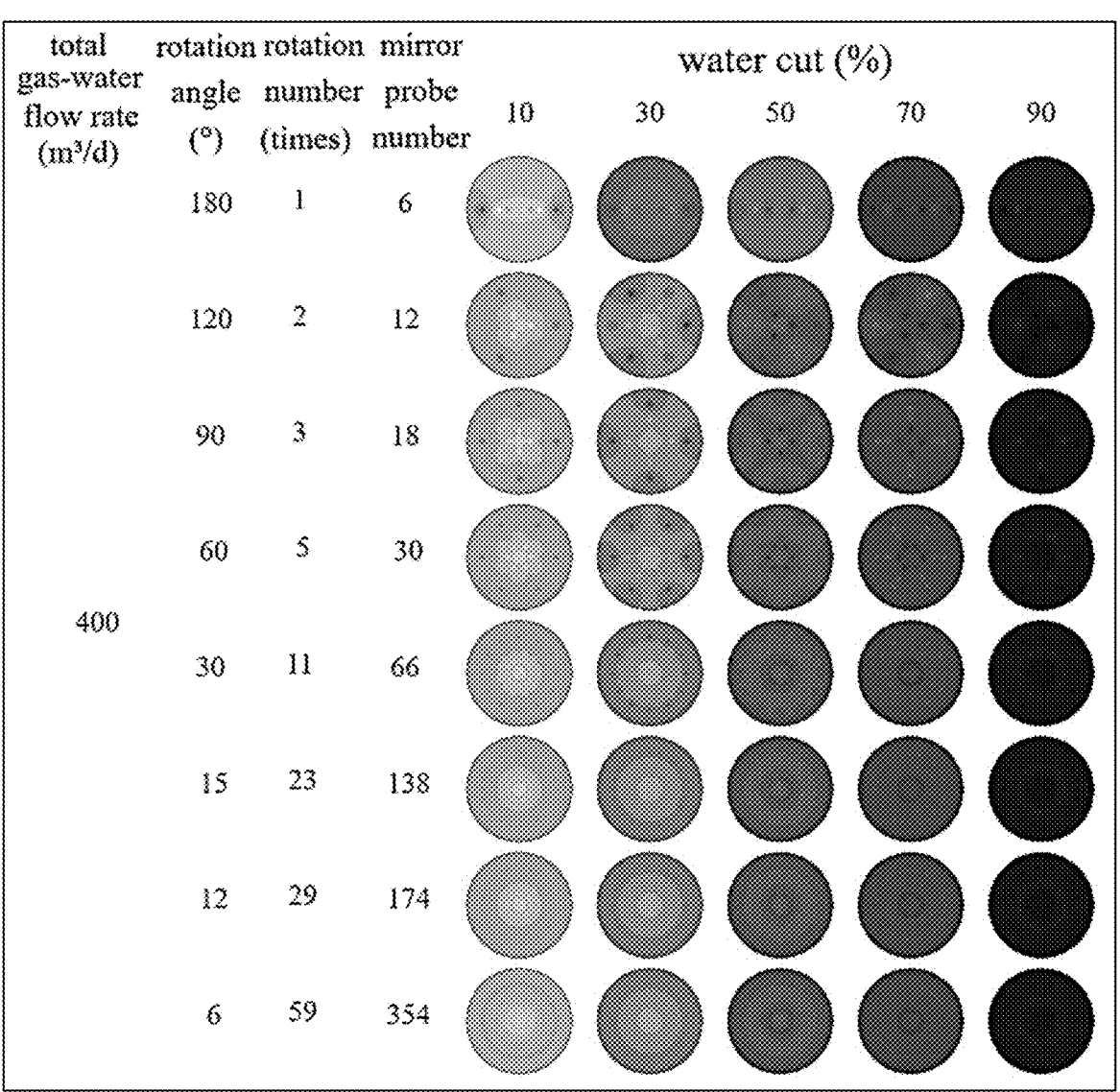
FIG. 10A and FIG. 10B illustrate reconstructed images of gas holdup after mirroring the six fiber optic probes; where
Figure 10B:
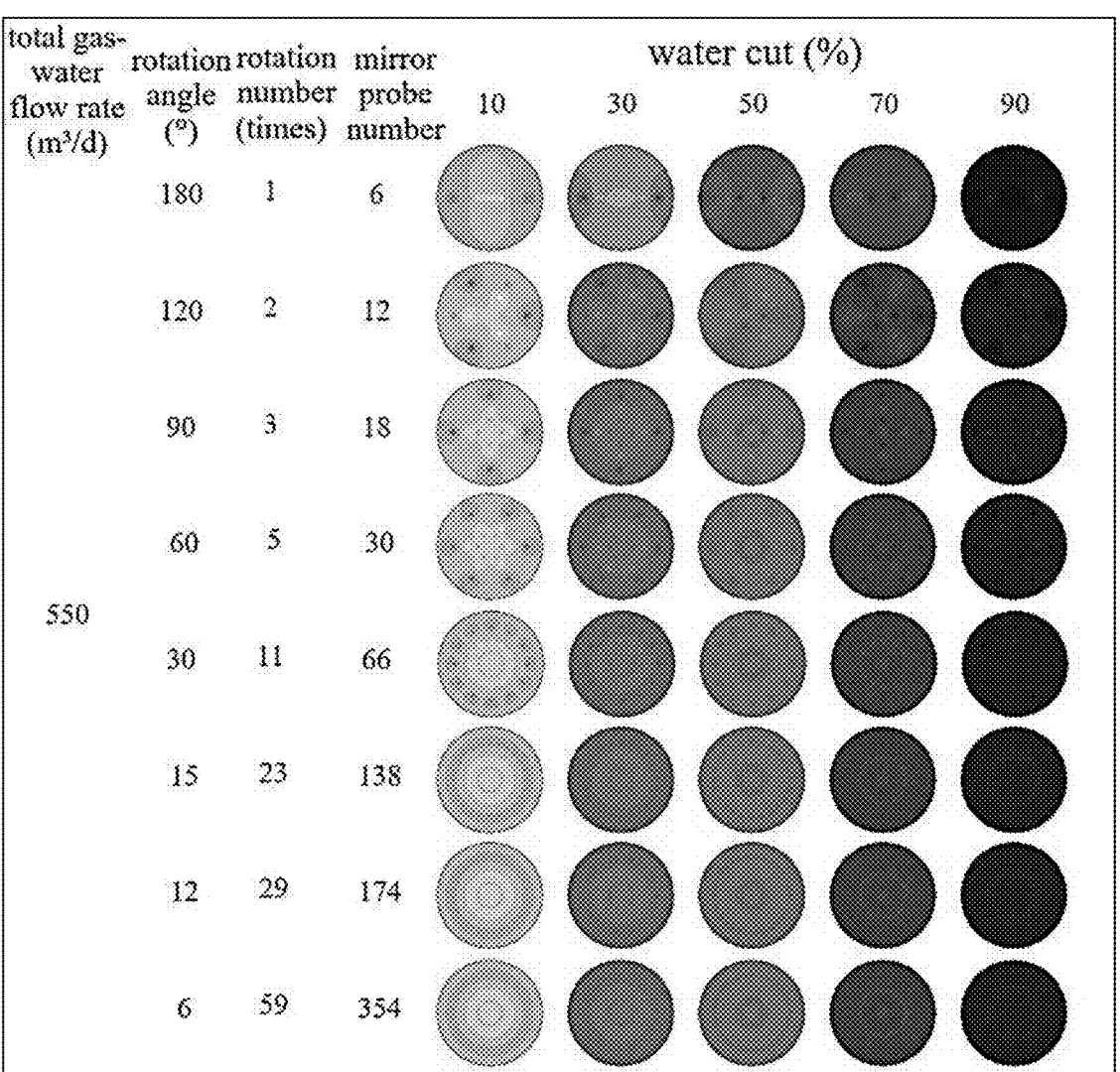

After continuous rotations for mirror processing mentioned above, $$\left(\frac{360}{n} - 1\right) \times 6$$

mirror probes are obtained, which is equivalent to having $$\left(\frac{360}{n} \times 6\right)$$

probes on the cross-section of the wellbore. The gas holdup image can be reconstructed with a large number of mirror probes according to the coordinate and the predicted value of the local gas holdup at each mirror probe. As shown in FIG. 9, taking rotating the six fiber optic probes counterclockwise twice as an example, a triangle represents a mirror probe obtained by rotating a fiber optic probe counterclockwise by 120°, a five-pointed star represents a mirror probe obtained by rotating a fiber optic probe counterclockwise by 240°. The six fiber optic probes are rotated twice to obtain twelve mirror probes, which is equivalent to having eighteen fiber optic probes at different positions on the cross-section of the wellbore, and the effect of the gas holdup image reconstruction with the eighteen probes is shown in FIG. 10A and FIG. 10B.

As a specific implementation, the step 5 specifically includes the following steps.

Based on the experimental data at a total gas-water flow rate of 400 m³/d and 550 m³/d and the step 4, the fiber optic probes are rotated by (180°, 120°, to 6°) for (1, 2, to 59) times, to obtain (354, 174, to 6) mirror probes. As shown in FIG. 10A and FIG. 10B, gas holdup images with different flow rates, different water cuts and different mirror times are reconstructed based on the mirror probes after rotation and the step 2.

By comparing and analyzing the experimental video data and the gas holdup imaging results after mirroring, it can be concluded as follows.

(1) When the total gas-water flow rate remains constant, as the rotation angle decreases, the number of mirror probes increases, and the gas holdup image overall appears smoother. At this point, it more closely aligns with the actual distribution pattern of the gas-water flow in the vertical well, which is symmetrical around the central axis of the wellbore.

(2) At the same total gas-water flow rate, when the water cut is low, an increase in the water phase flow rate intensifies the aggregation of gas bubbles; when the water cut is high, the gas clusters gradually increase, making it difficult for the fiber optic probes to detect small bubbles, affecting the quality of gas holdup imaging. This is specifically manifested as follows. 1. When the total gas-water flow rate is 400 m³/d, low water cut areas (such as 10% and 30%) are mainly the slug flow, and high water cut areas are mainly the bubble flow. The gas holdup imaging shows that there are more white areas at low water cuts, which is consistent with the characteristics of the slug flow. At high water cuts, the water phase is continuous and the gas phase is dispersed, which is consistent with patterns of the bubble flow. 2. When the total gas-water flow rate is 550 m³/d, at a water cut of 10%, it is mainly the froth flow, with the gas phase continuous and the water phase dispersed. At a water cut of 30%, it is mainly the slug flow, and at water cuts of 50%, 70%, and 90%, it is mainly the bubble flow, with the gas holdup imaging consistent with the experimental flow patterns.

Figure 11A:
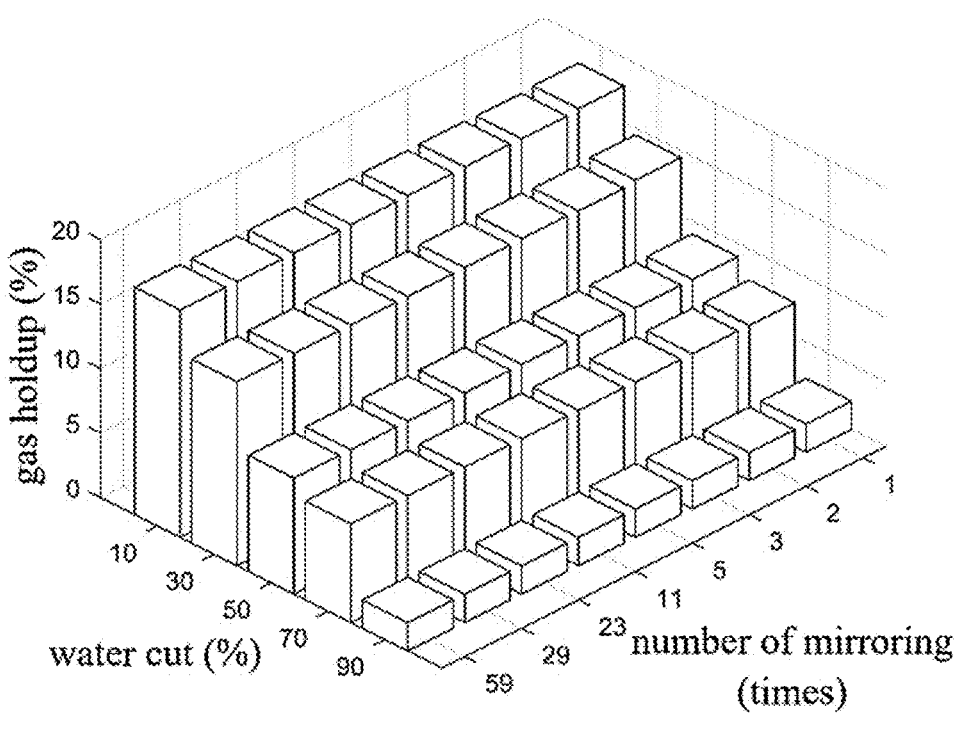
FIG. 11A and FIG. 11B illustrate gas holdup comparison diagrams under different flow conditions and different mirroring times according to the embodiment; where
Figure 11B:
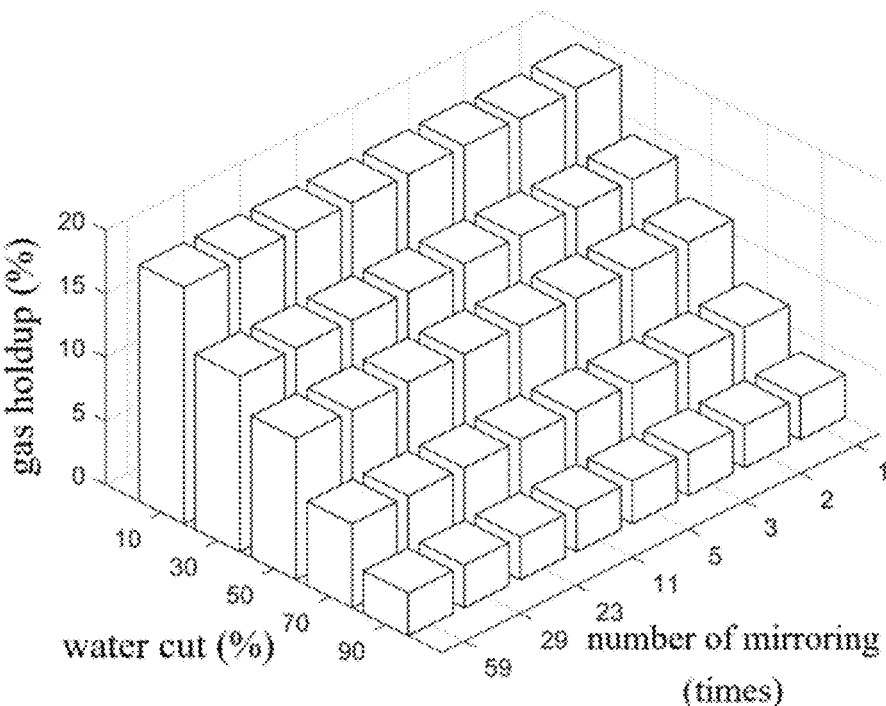

FIG. 11A and FIG. 11B illustrate the average gas holdup on the cross-section of the wellbore calculated under different water cuts and different times of mirror probe imaging when the total gas-water flow rates are 400 m³/d and 550 m³/d respectively. Upon comparison, it is found that: under same total gas-water flow rate conditions, as the water cut increases from a low to a high value, the gas aggregation becomes more pronounced with the increase in gas phase flow rate, and the average gas holdup in the wellbore also correspondingly increases. This trend is consistent with the actual situation. At the same time, the average gas holdup at a total gas-water flow rate of 550 m³/d is slightly higher than the average gas holdup at 400 m³/d.

Figure 12:
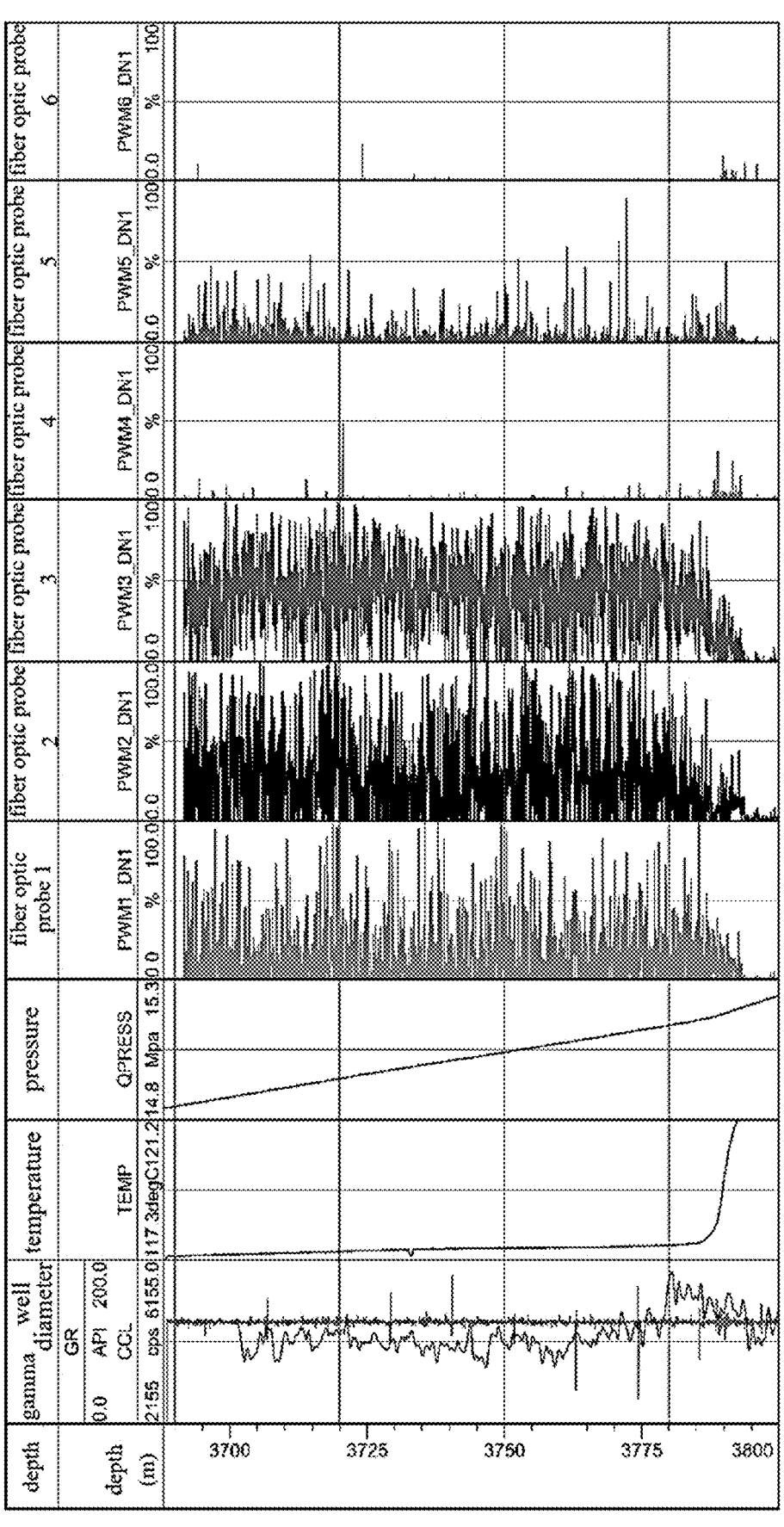
FIG. 12 illustrates a schematic diagram of a fiber optic probe curve playback according to the embodiment.

In a specific embodiment, it is known that a well A is a vertical gas-water well in a gas field in Northeast China. The well A was drilled to a depth of 4666 meters (m), and the well completion measurement data interpretation results indicate that there are 3 gas layers totaling 28.9 m, 17 poor gas layers totaling 255.2 m, and 6 gas-bearing layers totaling 235.6 m. On Nov. 3, 2024, the wellhead daily gas production was 36523 m³/d, and the daily water production was 75.04 m³/d. FIG. 12 shows the production profile logging data measured by the FIT at a lowering speed of 25 meters per minute (m/min). In the well A, the depth interval from 3785 m to 3798 m is a full flow layer with a temperature of 117.74 degrees Celsius (° C.) and a pressure of 15.3150 megapascals (MPa). After physical parameter calculation, the gas flow rate at the full flow layer is 277.31 m³/d, and the water flow rate is 72.93 m³/d. FIG. 13 shows the measurement data of the six fiber optic probes at the full flow layer, which have been imaged by using the step 2 and the step 3 with different numbers of mirroring. It is found that as the rotation angle of the fiber optic probes at each time decreases, the number of mirror probes gradually increases, and the gas holdup image overall appears smoother, better showing the distribution of gas and water across the cross-section of the wellbore in the well A. A comprehensive judgment indicates that the flow pattern here is gas-water two-phase slug flow.

The fiber optic probe array in the disclosure is suitable for high-temperature and high-pressure downhole environments and can be directly used for downhole measurements, offering significant practical application value. Compared with traditional single-probe technology for single-position measurement and flow imaging tools with more than 12 probes, on one hand, the demand for local gas holdup measurements at multiple different positions on the cross-section of the wellbore can be met, and on the other hand, the disturbance to fluid flow caused by a probe array can be reduced.

The disclosure, based on a multiphase flow simulation device and the FIT, utilizes the measurement information from six limited fiber optic probes, takes advantage of the radial symmetry of gas-water flow around the center of the wellbore during stable flow and introduces the method with mirroring probes to predict the mirror probe coordinates and values of the unmeasured points on the cross-section of the wellbore, realizing the gas holdup imaging reconstruction, thereby making the imaging results clearer, more intuitive, and accurate. Furthermore, the disclosure optimizes the calculation of the average gas holdup of the gas-water two-phase flow across the cross-section of the wellbore in vertical wells, more comprehensively reflecting the distribution of gas and water in the wellbore, effectively revealing the fluid characteristics of each producing layer in the wellbore, thereby improving the accuracy of production profiling assessment, and providing technical support for the implementation of water shutoff and gas enhancement strategies.

The embodiments herein are described in a progressive manner, with each embodiment emphasizing its differences from other embodiments. The same and similar parts between the embodiments can be referred to each other.

Specific examples herein are to explain the principles and implementation methods of the disclosure. The above embodiments are only used to help understand the core idea of the disclosure. Meanwhile, for those skilled in the art, there may be changes in the specific implementation and application scope based on the idea of the disclosure. In summary, the content of the specification should not be construed as limiting the disclosure.

What is claimed is:

1. A method for mirror imaging of gas holdup in gas-water two-phase flow based on a fiber optic probe array, comprising:

projecting six fiber optic probes of a flow imaging tool (FIT) onto a cross-section of a wellbore at a same height, gridding and normalizing an inner diameter of the wellbore and positions of the six fiber optic probes to obtain a cross-sectional grid, and determining a two-dimensional coordinate of each of the six fiber optic probes within the cross-sectional grid and a local gas holdup at the two-dimensional coordinate of each of the six fiber optic probes;

rotating, based on a radial symmetry of gas-water flow along a center of the wellbore, the six fiber optic probes counterclockwise by n° around the inner diameter of the wellbore for $$\left(\frac{360}{n} - 1\right)$$

times to obtain mirror probes, and obtaining coordinates of the mirror probes, wherein positions of mirror probes obtained by a final rotation differ from the positions of the six fiber optic probes by (360°−n°) respectively, the mirror probes are radially symmetrical, and a number of the mirror probes is $$\left(\frac{360}{n} \times 6 - 1\right);$$

and predicting, based on the two-dimensional coordinate of each of the six fiber optic probes and the local gas holdup at the two-dimensional coordinate of each of the six fiber optic probes, a gas holdup at the coordinates of each mirror probe of the mirror probes to obtain predicted gas holdup values of the mirror probes, interpolating the predicted gas holdup values of the mirror probes in the cross-sectional grid by using an interpolation algorithm to obtain a reconstructed gas-water image of the cross-section of the wellbore;

wherein the projecting six fiber optic probes of a FIT onto a cross-section of a wellbore at a same height, gridding and normalizing an inner diameter of the wellbore and positions of the six fiber optic probes to obtain a cross-sectional grid comprises:

projecting each of the six fiber optic probes of the FIT onto the cross-section of the wellbore to obtain six projection positions which are non-uniformly distributed, using a line formed by connecting the six projection positions as an X-axis, a perpendicular line to the X-axis as a Y-axis, and the center of the wellbore as a coordinate origin, and gridding and normalizing the cross-section of the wellbore to obtain the cross-sectional grid, wherein the cross-sectional grid comprises coordinate data for each grid cell; and wherein calculation formulas of the two-dimensional coordinate of each of the six fiber optic probes within the cross-sectional grid are as follows:

$$l_i' = l_i \times \cos \partial$$

$$x_i = \left| \frac{d}{2} - \frac{l_i'}{D} \right|$$

where $l_i'$ represents a distance from a projection point of an i-th fiber optic probe of the six fiber optic probes to a bottom of the FIT, $l_i$ represents a length of a part of an arm of the FIT from the i-th fiber optic probe to the bottom of the FIT, $\partial$ represents an opening angle of the FIT, D represents the inner diameter of the wellbore, d represents a normalized inner diameter of the wellbore, and $x_i$ represents the two-dimensional coordinate of the i-th fiber optic probe.

2. The method for mirror imaging of the gas holdup in the gas-water two-phase flow based on the fiber optic probe array as claimed in claim 1, wherein a calculation formula of the local gas holdup at the two-dimensional coordinate of each of the six fiber optic probes is as follows:

$$Y_{gi} = \frac{M_i - M_w}{M_g - M_w}$$

where $Y_{gi}$ represents a value of the local gas holdup at the two-dimensional coordinate of an i-th fiber optic probe of the six fiber optic probes, $M_i$ represents a measurement response value of the i-th fiber optic probe, $M_g$ represents a response value of the i-th fiber optic probe in pure gas, and $M_w$ represents a response value of the i-th fiber optic probe in pure water.

3. The method for mirror imaging of the gas holdup in the gas-water two-phase flow based on the fiber optic probe array as claimed in claim 1, wherein the obtaining coordinates of the mirror probes comprises:

rotating each of the six fiber optic probes $A_i$ (i=1, 2 to 6) with the two-dimensional coordinate of $(x_i, y_i)$ (i=1, 2 to 6) in the cross-sectional grid counterclockwise by $\theta°$ around the coordinate origin, multiplying a rotation matrix $R(\theta)$ with a coordinate vector $$\begin{bmatrix} x_i \\ y_i \end{bmatrix},$$

and determining a rotated coordinate point $(x_{ij}', y_{ij}')$ as follows:

$$\begin{bmatrix} x'_{ij} \\ y'_{ij} \end{bmatrix} = R(\theta_j)\begin{bmatrix} x_i \\ y_i \end{bmatrix}$$

$$\begin{cases} x'_{ij} = x_i(\cos\theta_j) - y_i\sin(\theta_j) \\ y'_{ij} = x_i\sin(\theta_j) + y_i\cos(\theta_j) \end{cases}$$

$$(i = 1, 2, \ldots, 6, j \in Z, Z \text{ represents an integer set})$$

where $\theta_j$ represents a j-th rotation angle, and $x_{ij}'$ and $y_{ij}'$ represent the coordinates of a corresponding mirror probe obtained by rotating an i-th fiber optic probe of the six fiber optic probes at the j-th rotation angle.

4. The method for mirror imaging of the gas holdup in the gas-water two-phase flow based on the fiber optic probe array as claimed in claim 3, wherein a calculation formula of the rotation matrix $R(\theta)$ is as follows:

$$R(\theta) = \begin{bmatrix} \cos(\theta) & -\sin(\theta) \\ \sin(\theta) & \cos(\theta) \end{bmatrix}$$

where $\theta$ represents a rotation angle with a unit being radians.

5. The method for mirror imaging of the gas holdup in the gas-water two-phase flow based on the fiber optic probe array as claimed in claim 4, wherein a calculation formula of the rotation angle is as follows:

$$\theta = \left(0, \frac{360}{n} - 1\right) \times \frac{n\pi}{180}$$

where n represents an angle of each rotation, $$\frac{360}{n} \in Z,$$

Z represents an integer sei, and $\pi$ is a mathematical constant pi.

\* \* \* \* \*